Figure 1:
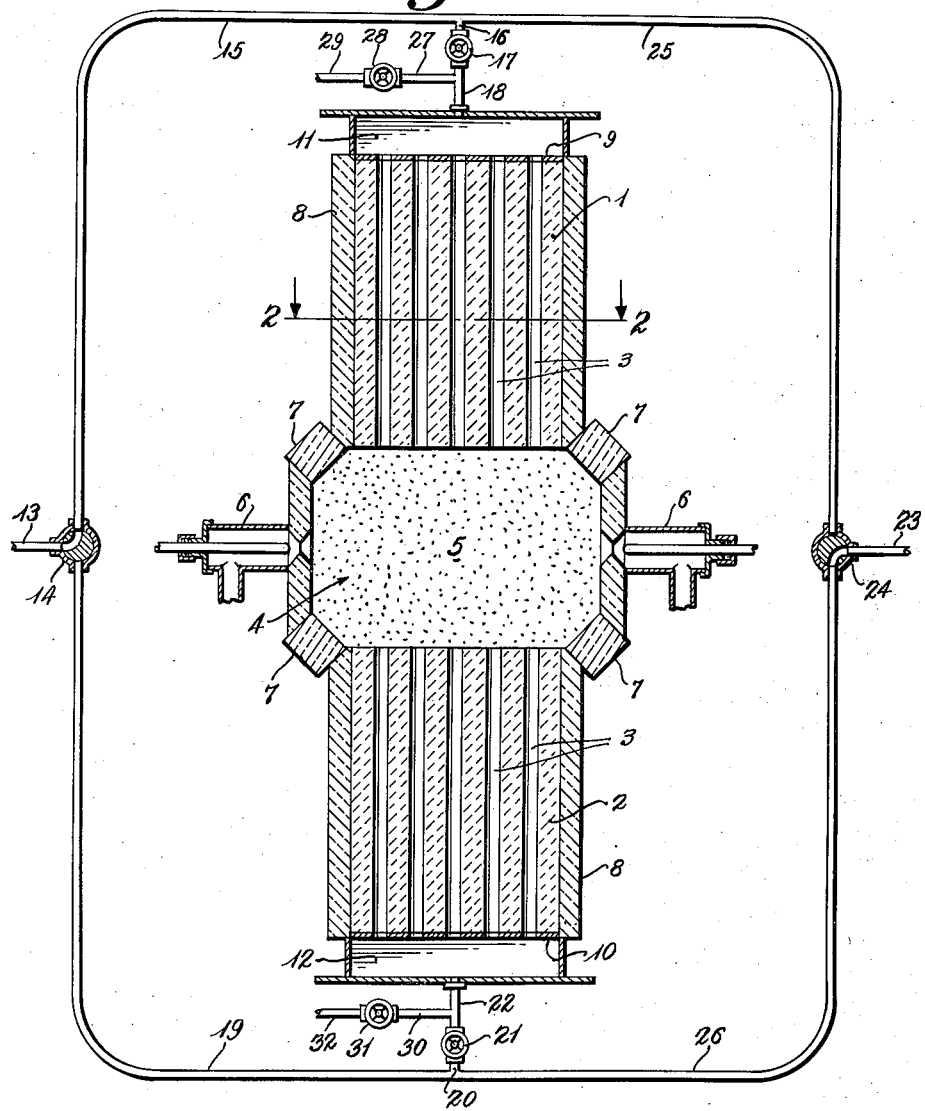

Aug. 5, 1958 R. L. HASCHE 2,846,296
REFRACTORY REGENERATIVE CATALYTIC PROCESS
Filed Nov. 14, 1950

INVENTOR
Rudolph L. Hasche
BY Burns, Doane and Benedict
ATTORNEYS

United States Patent Office 2,846,296
Patented Aug. 5, 1958

2,846,296

REFRACTORY REGENERATIVE CATALYTIC PROCESS

Rudolph Leonard Hasche, Johnson City, Tenn.

Application November 14, 1950, Serial No. 195,639

7 Claims. (Cl. 48—196)

This invention relates to a novel process and apparatus for carrying out endothermic reactions at high thermal efficiency which permits precise, simplified control of the reaction conditions to provide high yields of the desired products. More particularly, the invention relates to a catalytic regenerative process in which the highest temperature is obtained in a catalytic or surface active mass disposed between two regenerative masses.

One of the objects of the invention is to provide a highly efficient process and an apparatus for the catalytic reforming of natural gas and of petroleum hydrocarbons to produce heating or synthesis gas. Gas reforming processes known to the prior art to be useful for the production of heating or synthesis gas are highly inefficient.

A further object of the invention is to provide a highly efficient and economical process for the production of olefins and diolefins by the catalytic dehydrogenation of saturated aliphatic hydrocarbons.

It is an additional object of the invention to provide a process and apparatus which may be operated under a wide range of conditions with exceptionally high heat efficiency to produce improved yields of the desired products. In accordance with the invention the initial reactants are introduced into the apparatus of the invention at substantially atmospheric temperature, and the products are withdrawn from the apparatus at temperatures only slightly greater than atmospheric. The heat required to initiate the reaction is supplied by the sensible heat of the reaction products in a regenerative manner.

A further object of the invention is to provide a process of the type described wherein all of the heat required to maintain the endothermic reaction is generated within the process itself, without indirect transfer of heat from an external source.

A still further and a most significant object of the invention is to provide a regenerative process for effecting endothermic reactions in which the maximum furnace temperature is obtained in a catalytic mass disposed between two regenerative masses.

An additional object of the invention resides in the provision of a catalytic refractory regenerative process in which the maximum gas temperature is greater than the maximum temperature of any part of the catalytic regenerative furnace in which the process is carried out. In refractory regenerative processes known to the prior art there prevails in the regenerative furnaces utilized a temperature which is higher than the maximum temperature of the gases undergoing treatment.

In accordance with the catalytic refractory regenerative process of this invention endothermic gas reaction products are produced by passing a starting material capable of undergoing endothermic reaction through the channels of a first regenerative mass from the cooler to the hotter end thereof, said first regenerative mass having previously been heated to a temperature such that the endothermic reaction of the starting material is initiated in the course of such passage, thereafter passing said starting material into a reaction zone which has a catalyst disposed therein which is hotter than the maximum temperature of said first regenerative mass to substantially complete the endothermic reaction of the starting material and produce a product mixture, quenching said product mixture by passing the same through the channels of a second regenerative mass which has previously been heated similarly to said first regenerative mass from the hotter to the cooler end thereof.

The method of the invention for the production of endothermic reaction products may conveniently be carried out as an intermittent regenerative process which includes alternatively practiced production steps and heating steps. In such an intermittent process, the previously described production step is continued for such time as requisite heat for the maintenance thereof remains in the first regenerative mass. Generally speaking, this step may be continued for a period of about ½ to 3 minutes. The production step is thereafter discontinued, and a heating step is initiated by passing a combustible mixture of a fuel gas and air or free oxygen-containing gas through the second regenerative mass from the cooler to the hotter end thereof to initiate combustion in the final stages of such passage. The ignited fuel gas-air mixture is then passed into the catalytically packed reaction zone where the combustion reaction is completed. The hot combustion gases so produced are then quenched by passage through the flues of the first regenerative mass from the hotter to the cooler end thereof. This heating step is continued until the heat dissipated by the preceding production step has been replaced, at which time the production step is repeated.

In a preferred embodiment of the invention when flammable starting materials are employed, at least a portion of the heat requisite to support the endothermic reaction is produced by partial combustion of the starting material. This preferred process is carried out by passing a nonflammable mixture containing an exothermically combustible starting material and a free oxygen-containing gas through the channels of a first refractory regenerative mass from the cooler to the hotter end thereof to effect incipient endothermic reaction of the combustible starting material and produce a flammable second mixture, passing said second mixture into a reaction zone having a mass of catalytic material disposed therein and which has been heated to a temperature hotter than the maximum temperature in said first regenerative mass, where the previously initiated endothermic reaction is maintained by a simultaneously occurring combustion reaction, the extent of which is controlled by the amount of free oxygen present, to produce at a temperature higher than that of said catalytic material a third gaseous mixture comprising the desired product, and thereafter quenching said third gaseous mixture by passing the same through the channels of a second regenerative mass from the hotter to the cooler end thereof. Heat imparted to the regenerative mass to quench the product is utilized to raise additional quantities of starting material to endothermic reaction temperature when the direction of gas flow is reversed.

It will be apparent that this preferred process of the invention may be carried out in several ways. For example, the previously described intermittent process of the invention may be modified by utilizing in the production step a mixture of flammable starting material and a limited quantity of free oxygen-containing gas in proportions requisite to effect combustion of a portion of the starting material in the reaction zone of the regenerative furnace sufficient to provide only a part of the heat dissipated by endothermic reaction of starting material. This process is somewhat related to the regenerative process disclosed in Hasche application, Serial No. 175,941, filed July 26, 1950, but differs therefrom in that a catalyst is provided to cause reforming of acetylene, carbon, and saturated hydrocarbons. For example, when a steam diluent is employed the reforming reactions produce carbon monoxide and hydrogen.

In this sometimes preferred modification, the production step and the heating step are likewise alternated at appropriate intervals. Generally speaking, a period of about 1 to about 4 seconds is adequate for the heating step. Preferably this step is carried out for about 1 to about 2 seconds. The production step may be carried out until the temperature of the refractory mass falls below that requisite for efficient operation. Generally, the production step can be carried out for a period of about one minute, preferably from about 30 seconds to about 100 seconds.

Considering in more detail the production step of this embodiment of the invention, in those instances where a hydrocarbon, for example, is employed as a starting material for the production of a heating gas, synthesis gas, or the like, the hydrocarbon is first mixed in nonflammable proportions with air or other oxygen-containing gas, and the mixture is heated to the incipient endothermic reaction or cracking temperature of the hydrocarbon, by passage through the channels of a first regenerative mass. There is produced in this manner a flammable second mixture containing carbon and hydrogen in addition to the hydrocarbon starting material. The second mixture is passed into a catalyst packed reaction zone where the combustion of this carbon and hydrogen together with a minor portion of the original hydrocarbon provides the heat required to propagate the endothermic cracking and reforming reactions. The product gas is obtained in this manner at a temperature which is hotter than the maximum temperature of the catalytic mass or the regenerative masses of the furnace employed. Heat released by the quenching of the product so obtained is stored in the second regenerative mass and utilized in conjunction with the heat imparted to the mass by the heating step to heat additional quantities of the starting mixture to the incipient alteration temperature of the starting material.

A self-sustaining and substantially continuous partial combustion modification of the invention may be achieved by introducing combustible starting material with sufficient air or other free oxygen-containing gas to render the process substantially isothermal by effecting combustion of an adequate quantity of the starting material to impart to the regenerative mass in which the products are quenched, heat requisite to raise additional quantities of starting material to incipient thermal alteration or endothermic reaction temperature. This process can be reflected substantially continuously by reversing the flow of gases through the furnace at appropriate intervals. Generally speaking, the gas flow should be reversed about every one to three minutes. It will be appreciated that through the medium of this embodiment of the invention, the heating step of the previously described intermitted processes is completely eliminated. This continuous process is related to an analogous regenerative process described in Hasche application, Serial No. 154,185, filed April 5, 1950, but differs therefrom in that a catalyst is provided to cause reforming of acetylene, carbon, and saturated hydrocarbons.

It will be appreciated that only a relatively small portion of the combustible starting material, normally not more than about 15 to about 40% thereof will be consumed by the limited combustion reaction which occurs when the process is carried out continuously. When the process is carried out intermittently in conjunction with a heating step as previously described, not more than about 10% to about 20% of the combustible starting material will be consumed in the combustion reaction. The balance of the starting material in both instances will be efficiently thermally altered by the heat released by such limited combustion. The sensible heat of the entire gas mixture undergoing treatment in the process will accordingly be raised to the flame temperature of the combusion reaction which temperature is above that necessary to initiate thermal alteration or endothermic reaction of the starting material. This excess heat is imparted to the regenerative masses in the quenching step, and is utilized either solely or in conjunction with that produced by the heating step to raise additional quantities of starting material to incipient thermal alteration or endothermic reaction temperature.

It will be appreciated that the above-described, preferred, partial combustion regenerative processes differ radically from regenerative processes of the prior art. The prior art teaches that the regenerative masses employed to effect the desired endothermic reactions must be preheated to a temperature in excess of that required for such reactions. That is, in the processes of the prior art regenerative masses are employed which are at least as hot as the product gases produced and the regenerative masses alone must supply the heat requisite not only to initiate but also to maintain the endothermic thermal alteration reactions. Such processes are necessarily attended by excessive heat loss, and therefore, highly inefficient.

In contrast with such prior art processes, in the preferred processes of this invention the product gases when produced are substantially hotter than the regenerative masses and the catalytic mass with which they come into contact. That is, the regenerative masses and catalytic mass are always at a temperature substantially lower than the maximum gas temperature. Furthermore, in the actual thermal alteration phase of the process the endothermic and exothermic reactions are substantially in balance. Hence there is no significant heat loss in the system. Operation at high temperatures without serious adverse effect upon the refractory material of the regenerative masses is thus made possible.

It will be understood that the refractory regenerative masses must be preheated prior to the initiation of the various processes of this invention to establish a temperature gradient therein. This preheating may be effected in any desired manner. Normally, the refractory regenerative furnaces employed are provided with heating means for the purpose. A desirable mode of operation entails heating the regenerative masses in a manner such that a combustible gas mixture of fuel gas and air or other free oxygen-containing gas will be ignited in the final stages of passage from the cooler to the hotter end thereof and thereafter passing such mixtures of fuel gas and oxygen-containing gases through the furnace. To accomplish this result the catalytic mass disposed between the regenerative masses is heated to a temperature in excess of 1000° C., preferably from about 1100° C. to 1300° C. Similarly, the refractory regenerative masses are desirably preheated in such a manner that the cooler ends are at a temperature of about 100° C., preferably 75° C. to 150° C., and the hotter ends are about 1000° C., preferably 950° C. to 1150° C. The ultimate temperature gradient established in the regenerative masses should be such that the hotter end of each mass is at a temperature in excess of 900° C., preferably 1,000° C. to 1300° C. When the preferred high efficiency furnaces of this invention are employed, the cooler end of the regenerative masses, even after continued operation, are normally at a temperature within the range of 100° C. to 150° C., such temperatures, of course, similarly resulting from the preheating operations of the type previously described.

A salient and critical feature of the various processes of the invention resides in passing the gases through a mass of catalytic material disposed between the previously described first and second regenerative masses. It will be understood that the phrase "catalytic material" as employed herein is embracive of and generic to materials which effect catalytic action due to their particular chemical constitution and also to materials which are catalytically active as a consequence of surface phenomena for which they are responsible. In other words, the mass of catalytic material may be inert insofar as catalysis due to chemical composition is concerned, but effective solely as a consequence of the large amount of surface area exposed. The catalytic mass preferably takes the form of particulate or pelleted material of the type commercially available.

It will be appreciated that the catalytic mass may be of several types, as regards chemical and physical constitution, depending upon the type of reaction it is desired to carry out. For example, a nickel type catalyst is preferred to carry out gas reforming reactions of the following types:

$$CH_4 + H_2O \rightarrow CO + 3H_2$$
$$CH_4 + CO_2 \rightarrow 2CO + 2H_2$$

Operations employing this type of reaction are effective for the production of heating or synthesis gas. Other catalysts that may be employed for this purpose include chromium, cobalt, iron, copper, and silver and the various oxides and salts thereof.

For example, chromium oxide catalysts may be employed for carrying out dehydrogenation reactions of the following type:

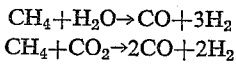

Combustion reactions such as those availed of in the reforming of methane or higher hydrocarbons to produce heating gas or endothermic gas reaction products comprising unsaturated compounds and aromatics are preferably catalyzed with masses of surface active material such as alumina and silicon carbide.

Other catalysts known to the art may equivalently be employed to effect reactions for which they are particularly appropriate in the process of this invention.

It is further essential and critical to the success of the process of this invention that both the starting material and free oxygen-containing gas, diluent, or the like, be preheated as a mixture to the endothermic reaction temperature. The addition of unpreheated oxygen or oxygen-containing gas to the heated starting material or the addition of unheated starting material to the heated oxygen-containing gas is not operable in this invention. Similarly, separate preheating of the free oxygen-containing gas and the starting material followed by commingling of the so heated materials in the reaction zone is unsatisfactory.

It is additionally essential to the success of the invention that low pressure drop, a high rate of heat transfer, and short contact time with the regenerative furnace and catalyst mass of the gases undergoing endothermic reaction be adhered to.

It is accordingly critical that the period of residence of the gases undergoing treatment in each of the first and second regenerative masses not exceed about 0.3X seconds, where "X" represents the pressure in absolute atmospheres at which the process is carried out. A preferred range for this residence period is from about 0.05X to about 0.1X second. It is likewise critical that the period of residence of the gases undergoing treatment in the reaction zone containing the catalyst material where the simultaneous combustion and endothermic reaction occurs not exceed about 0.05X second. A preferred range for this period of residence is from about 0.01X to about 0.03X second. Subatmospheric pressure operations are preferably effected at about 0.2 to about 0.8 atmosphere absolute and are particularly useful in the production of heating gas and low molecular weight olefins from hydrocarbons; hydrazine from ammonia, and the like.

A preferred pressure range for super-atmospheric operations such as those utilized for the production of higher olefins is from about 2 to 5 atmospheres absolute.

When oxygen is utilized in lieu of air, the residence time of the gases undergoing treatment in the furnace may be reduced to about one-half of that required with similar operations conducted with air. Thus the residence time at atmospheric pressure when oxygen is utilized may be reduced to a few thousandths of a second. It will be appreciated that analogous modifications in residence time may be effected when other gases richer or poorer in free oxygen than air are employed. To obviate the possibility of overloading the furnace when gases extremely rich in oxygen are employed, reduction in residence time is desirably effected by decreasing the pressure rather than by increasing the rate of feed.

It will be obvious that the reduction of residence and quenching periods by the reduction in pressure in the system can be accomplished without appreciable change in pressure drop through the regenerative mass because only the lineal gas velocity is increased, not the mass velocity. This feature of restricted pressure drop constitutes one of the salient advantages of this invention.

Certain additional critical limitations must be observed with respect to embodiments of the invention in which a portion of the heat required is supplied by combustion of a flammable starting material. It is required in these preferred partial combustion embodiments of the invention that the original mixture of starting materials containing oxygen or a free oxygen-containing gas in non-flammable proportions to preclude excess combustion of the starting material by the combustion reaction. Furthermore, only so much oxygen or free oxygen-containing gas is employed in the production step as is required to obtain the heat requisite to the production of the desired product and to the maintenance of the process.

Air, oxygen or oxygen in admixture with other gases such as nitrogen which are inert under the conditions may be employed. Air is preferred.

Speaking generally, air may be mixed with low molecular weight hydrocarbons for use in the partial combustion processes of the invention in the range in parts by volume of from 0.5 part of air per part of hydrocarbon to 2.5 parts of air per part of hydrocarbon. Similar ratios, for oxygen are from 0.1 part of oxygen per part of hydrocarbon to 0.5 oxygen per part of hydrocarbon. Those skilled in the art will readily be able to determine the proper proportions of free oxygen-containing gas to employ with starting materials other than hydrocarbons.

The limits of combustible proportions of the various hydrocarbons and other combustible gases with oxygen and air are well known to the art. These limits for methane, ethane and propane are set forth in Table I:

TABLE I

| Hydrocarbon | Inflammable Limits | |
|---|---|---|
| | Air | Oxygen |
| Methane | 6.2–16.0 | 0.7–16.0 |
| Ethane | 7.0–30.0 | 1.0–23.0 |
| Propane | 9.7–41.0 | |

The preferred proportions of oxygen and air required for use in this invention both for continuous and intermittent operation at atmospheric pressure are set forth in Table II:

TABLE II

| Hydrocarbon | Range of Operation | | | |
|---|---|---|---|---|
| | Intermittent Process | | Continuous Process | |
| | Oxygen | Air | Oxygen | Air |
| Methane | 0.1–0.3 | 0.5–1.5 | 0–2–0.6 | 1.0–3.0 |
| Ethane | 0.1–0.4 | 0.5–2.0 | 0.15–0.7 | 0.75–3.5 |
| Propane | 0.1–0.5 | 0.5–2.5 | 0.2–1.0 | 1.0–5.0 |

NOTE.—Numbers in Tables I and II indicate parts by volume of oxygen or air per volume of hydrocarbon.

It will be noted that Tables I and II show that in the process of this invention there is never employed a feed mixture which is originally flammable.

The provision of a novel regenerative furnace structure in which the process of the invention may be carried out is one of the primary features of this invention. Briefly stated, the furnace structure of this invention includes two heat-insulated, axially-aligned refractory regenerative masses having continuous flues passing therethrough and having a heat insulated reaction zone packed with catalytic material disposed therebetween, manifold means in association with the ends of each of said masses opposite said reaction zone, and means in association with each of said manifold means for the admission and discharge of gases therefrom. Means for reversing the flow of gases through the furnace are likewise appropriately included.

The invention will be better understood by reference to the drawing, in which:

Figure I is a horizontal section of a furnace conforming to one embodiment of the invention; and, Figure II is a vertical cross-section of the furnace at right angles to the sectional view of Figure I, and taken along the line 2—2 of Figure I.

The furnace as shown in Figures I and II has two axially-aligned regenerative masses 1 and 2 having unobstructed flues 3 passing therethrough. The inner ends of masses 1 and 2 are spaced apart to form the end walls of the reaction zone 4 which is packed with particulate catalytic material 5 such as alumina, nickel or silicon carbide. Reaction zone 4 is provided with heating means 6 which may conveniently take the form of burners for liquid or gaseous fuel. Reaction zone 4 is also provided with access doors 7 for convenience of charging and removal of catalyst. Regenerative masses 1 and 2 and reaction zone 4 are provided with suitable heat insulating material 8, which preferably consists of refractory brick, refractory cement or the like.

The ends of masses 1 and 2 opposite reaction zone 4 are supported by grids 9 and 10 and are provided with manifold chambers 11 and 12, respectively. Manifold chambers 11 and 12 are associated with appropriate gas inlet and withdrawal means and means for reversing the flow of gases through the furnace. As shown in Figure I, such means include line 13 and three-way valve 14 which is connected through line 15, line 16, valve 17 and line 18 to manifold chamber 11. Three-way valve 14 is similarly connected through line 19, line 20, valve 21 and line 22 to manifold chamber 12.

In like manner line 23 leads to three-way valve 24 which is connected through line 25, line 16, valve 17, and line 18 to manifold chamber 11. Three-way valve 24 is similarly connected through line 26, line 20, valve 21 and line 22 to manifold chamber 12. Manifold chambers 11 and 12 are each provided with gas exhaust means including respectively, line 18, line 27, valve 28, and line 29 in association with manifold chamber 11, and line 22, line 30, valve 31 and line 32 in association with manifold chamber 12.

High heat transfer, short residence period and low pressure drop in the regenerative furnace are essential to the successful practice of this invention. To this end, it is necessary that the particular furnace structure embraced by this invention conform to certain structural limitations. It is critical that the length of the regenerative checkerworks 1 and 2 not exceed about 15 feet. Likewise, regenerative checkerworks of less than four feet in length are impractical, although the lower limit is not necessarily critical. A preferred length for the regenerative checkerworks is from about 6 to about 10 feet.

Likewise, the volume of the reaction zone of the furnace should not exceed about 60% of the combined volume of the flues contained in the two regenerative masses of the furnace. It is preferable that the volume of the reaction zone be equal to from about 20% to about 40% of the combined volume of the flues.

It is also essential that the gas passageways or flues 3 in the refractory regenerative checkerwork 2 not exceed about 0.75 inch in maximum cross-section or diameter. The lower limit of operable width or diameter of such flues is not necessarily critical, but must not be so small that excess pressure drop in the furnace occurs as a consequence thereof. Generally flues of maximum width or diameter from about 0.25 inch to about 0.75 inch may be feasibly employed. Flues having a maximum width or diameter of 0.375 inch to about 0.5 inch are preferred.

It is also essential that the ratio of the volume of the flues in the regenerative mass to the total volume of the regenerative mass in which the flues are located not exceed about 1:3. A preferable range for this ratio is from about 1:4 to about 1:10, and a suitable lower limit is about 1:20.

A particularly appropriate type of checkerbrick for use in the construction of the regenerative checkerwork of the furnace of this invention is that described and claimed in my co-pending application Serial No. 129,969, entitled "Regenerative Packing Construction," filed November 29, 1949, and now abandoned. These checker bricks are prepared from any conventional refractory material such as the various calcium, magnesium, aluminum, silicon, iron, chromium, etc. oxides and mixtures thereof. Furthermore, as a consequence of the thermodynamic advantages of the process of this invention in the lower or cooler portions of the regenerative masses, a checkerwork metal such as iron or copper or a checkerwork graphite may be employed. Preferably, the bricks are prepared from a material having a high alumina content to obtain maximum heat capacity, high refractoriness, high thermal stability and inertness toward the gases undergoing treatment.

Figure 2:
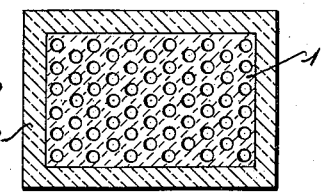

The novel placement of the flues in this particular checkerbrick is shown in Figure 2. It will be observed that the flues are so disposed that the distance from the center of each flue to the center of the next most closely adjoining flues is uniform. For the furnace of this invention, this center to center distance should not exceed about 1 inch. A preferable range for this distance is from about 0.62 inch to about 0.88 inch. The minimum thickness of the refractory walls separating the flues should not be greater than about 0.75 inch. A preferable range for this minimum distance is about 0.37 inch to about 0.625 inch. When these limits are observed, the previously defined limits with respect to the ratio of the volume of the flues in the regenerative masses to the total volume of the masses in which the flues are located will be complied with.

Operation of the furnace and process of the invention to produce a catalytically reformed natural gas of low density will be described by reference to Figure I.

*Example I*

Prior to the initiation of the gas reforming reaction, the furnace must be preheated. To this end valves 28 and 31 are opened and valves 17 and 21 are closed. Heating means 6 is then actuated and combustion of fuel takes place in the catalyst bed 5 of the reaction zone 4. The hot combustion gases so produced pass into two opposite streams through the flues 3 of refractory regenerative masses 1 and 2 and thence into the manifold chambers 11 and 12, respectively. From the manifold chamber 11 the combustion gases exit from the furnace through line 18, line 27, valve 28 and line 29. From the manifold chamber 12 the combustion gases exit from the furnace through line 22, line 30, valve 31 and line 32.

In the course of this preheating process the maximum temperature is attained in the catalyst bed 5 of the reaction zone 4. The hot combustion gases give up heat to regenerative masses 1 and 2 during the course of passage therethrough. The heat efficiency of the furnace is such that the combustion gases exit therefrom at a temperature of about 100° C. The preheating process is continued until the catalyst bed 5 attains a temperature in excess of 900° C., preferably 1000° C. to 1200° C. There is thus provided in the regenerative masses 1 and 2 a temperature gradient from about 1000° C. at the juncture thereof with the catalyst bed 5 to about 100° C. at the outer ends. At the termination of the preheating period valves 28 and 31 are closed, and valves 17 and 21 are opened.

The production step is then initiated by introducing a nonflammable mixture of natural gas and air and steam in volume proportions of about 1:1.5:0.3 through line 13, three-way valve 14, which is open in the position shown, line 15, line 16, valve 17 and line 18 into manifold chamber 11. The nonflammable natural gas-air mixture then passes through the flues 3 of regenerative mass 1 into the catalyst bed 5 in the reaction zone 4. A catalyst bed of nickel pellets was employed. In the course of such passage, the temperature of the natural gas-air mixture is raised until thermal alteration, consisting essentially of incipient reforming and cracking of the hydrocarbons in the natural gas, occurs in the final stages thereof. This incipient cracking reaction renders the mixture flammable, and combustion is initiated. This combustion reaction continues in the reaction zone 4, and provides the heat requisite to the maintenance of the endothermic reforming or cracking reactions which simultaneously occur. Subsequent to the simultaneously combustion and reforming reactions, the product gases produced pass through the flues 3 of the regenerative mass 2 and thence into manifold chamber 12. In the course of such passage, the gas products give out sensible heat to the regenerative mass 2. The thermal efficiency is such that the product gases pass into the manifold chamber 12 at a temperature not substantially exceeding 100° C., and from the manifold chamber 12 the product gases pass out of the furnace through line 22, valve 21, line 20, line 26, three-way valve 24 and line 23 to a gas recovery system not shown.

This production step is continued in the manner specified for a period of approximately one minute, after which three-way valves 14 and 24 are reversed as rapidly as possible. Preferably this reversal is effected in a period of less than one second. The starting mixture of natural gas, steam and air then flows through line 13, three-way valve 14, line 19, line 20, valve 21 and line 22 into manifold chamber 12. From manifold chamber 12 the starting mixture passes through the flues 3 of the refractory regenerative mass 2 and thence into the reaction zone 4. In the manner previously described, this starting material is heated to incipient cracking temperature in the final stages of passage through the flues 3 of the regenerative mass 2, whereby combustion is initiated. The combustion and reforming reactions are then completed in the catalyst bed 5 of the reaction zone 4, and the hot combustion products produced pass through the flues 3 of the regenerative mass 1 into the manifold chamber 11, and thence out of the furnace through line 18, valve 17, line 16, line 25, three-way valve 24 and line 23 to a gas recovery system not shown. Gas flow in this direction is continued as before for a period of about one minute, and reversal of three-way valves 14 and 24 is then effected to reverse the flow of gas through the furnace. It will be appreciated that a substantially continuous flow of starting materials is introduced through the line 13 and that a continuous flow of products is withdrawn through line 23. Thus there has been described a continuous and self-sustaining process for the production of reformed heating gas.

The product gas obtained was of the following composition in percentage by volume:

| | |
|---|---|
| Carbon dioxide | 0.9 |
| Illuminants | 0.9 |
| Hydrogen | 37.8 |
| Carbon monoxide | 16.2 |
| Methane | 9.8 |
| Nitrogen | 34.4 |

This product gas is characterized by the heating value of approximately 290 B. t. u. per cubic foot and density compared to air of 0.6, and can be blended with natural gas to produce a gas having a heating value of 530 B. t. u. per cubic foot, which is a satisfactory interchange for conventional manufactured heating gas.

One of the outstanding advantages of this continuous process is that the reforming of the natural gas can be effected without the application of either external heat or of heat stored in the regenerative masses of the furnace by an intermittent heating period such as has been conventional in prior art processes. Furthermore, the thermal efficiency of this process is substantially greater than 95%, as compared with the maximum thermal efficiency of 70 to 75% obtainable by the processes of the prior art.

As previously noted, nickel was utilized as a catalyst in this example. If a catalytic mass consisting of alumina or silicon carbide is employed in a similar proccess, a product gas will be obtained which contains a higher proportion of unsaturates and a smaller proportion of hydrogen, inasmuch as a portion of the hydrogen produced is consumed by the combustion reaction. When the nickel catalyst is employed, however, the steam which initially forms in the partial combustion reaction, at least in part from the burning of the hydrogen to form water, catalytically reacts with the methane to form carbon monoxide and additional hydrogen.

The process and apparatus of this invention may likewise be employed to produce with high efficiency and economy a very low density gas which is high in hydrogen by reforming a hydrocarbon with steam. For this purpose, a "make" and "heat" intermittent type of operation is employed. In this process likewise, the furnace must first be preheated in the manner described in Example I.

The following example in which a catalyst consisting of nickel pellets of the type described in Example I is employed is illustrative of this intermittent process.

*Example II*

A mixture of propane and steam in the proportions of about one part by volume of propane to about 4.5 parts by volume of steam is introduced into the furnace through line 13, three-way valve 14, line 15, line 16, valve 17 and line 18 into manifold chamber 11. From manifold chamber 11 the propane and steam mixture passes through the flues 3 of the regenerative mass 1, and thence into the nickel catalyst mass 5 disposed in the reaction zone 4. In the course of passage through the flues 3 of the regenerative mass 1, the propane and steam mixture is preheated, and in the final stages of such passing, cracking and reforming reactions are initiated. These cracking and reforming reactions are carried to completion in the catalyst bed 5. The endothermic heat required for this reforming reaction has been stored up in the regenerative mass 1 and in the catalyst bed 5 by the previous preheating operation, as more particularly described hereinafter. The gaseous reforming reaction products pass from the reaction zone 4 through the flues 3 of the regenerative mass 2, giving up sensible heat thereto, and thence into the manifold chamber 12. From the manifold chamber 12, the product gases pass out of the furnace though line 22, valve 21, line 20, line 26, three-way valve 24 and line 23 to a gas recovery system not shown. Valves 28 and 31 are closed during this operation. This production step is carried out for approximately one minute, after which three-way valves 14 and 24 are simultaneously reversed. Fuel gas is then admitted in combustible proportions with air through line 13, three-way valve 14, line 19, line 20, valve 21 and line 22 into manifold chamber 12. This combustible mixture of fuel gas and air passes through the flues 3 of the regenerative mass 2 wherein it is heated to ignition temperature during the final stages of such passage. Combustion of this fuel gas is completed in the catalyst bed 5 disposed in the reaction zone 4, and the gaseous combustion products pass out of the furnace through the flues 3 of regenerative mass 1 into manifold chamber 11 and exit from the furnace through line 18, valve 17, line 16, line 25, three-way valve 24, and line 23 thence to a stack not shown. This heating operation is caried out for a period of time to store up in the catalyst bed and the regenerative mass 1 the heat which was removed by the preceding production step. It will be appreciated that the combustible gases produced surrender their sensible heat to the refractory materials of the regenerative mass 1. These gases are discharged from the mass 1 at a temperature not substantially gretaer than about 100° C.

The products produced by the process of this example contained the following ingredients of percentage by volume:

Carbon dioxide _____ 2.6
Ethylene _____ 0.9
Hydrogen _____ 64.5
Carbon monoxide _____ 24.4
Methane _____ 7.6

This product gas has a specific gravity of 0.38 and a heating value of 380 B. t. u. per cubic foot. It will be noted that the product is substantially free from inert diluent, and is a very satisfactory gas for blending with propane to produce a heating gas which may be substituted for natural gas. Furthermore, this product gas is produced in accordance with the process of this invention with a thermal efficiency of over 95% as compared with thermal efficiency of approximately 50% as practiced in the prior at.

*Example III*

An operation similar to that described in Example II, in which an intermittent "make" or "heat" cycle is employed, but in which air is utilized in nonflammable proportions in conjunction with the natural gas and steam diluent was effected. The starting materials were utilized in a volume ratio of natural gas, air and steam of 1:0.78:0.35. In this operation, a portion of the heat required is supplied by a partial combustion of the hydrocarbon starting material in the "make" step of the cycle.

The product gas obtained was of the following composition in percentage by volume:

Carbon dioxide _____ 1.8
Ethylene _____ 1.0
Carbon monoxide _____ 15.0
Hydrogen _____ 47.2
Methane _____ 14.1
Nitrogen _____ 20.9

This heating gas was characterized by a heating value of 359 B. t. u. per cubic foot and a specific gravity of 0.5, and was produced with a thermal efficiency of 98%. It could be blended with natural gas or propane to give a satisfactory interchange material for natural gas.

While the pocesses of this invention have been described particularly with reference to a novel refractory regenerative furnace which is particularly adapted thereto, these new pocesses may be practiced in other types of apparatus, and it is only critical that the various limitations hereinbefore described be observed. The process of this invention makes it possible for the first time to produce the various endothermic gas reactions in a highly efficient catalytic regenerative manner, and to produce better yields of the desired product in a more simple manner than is possible by any method known to the prior art.

I claim:

1. A continuous, catalytic, cyclic, regenerative process for carrying out endothermic gas reactions at high temperature to produce endothermic reaction products which comprises preheating a mixture of gaseous endothermically alterable starting material comprising hydrocarbon and a free oxygen-containing gas to endothermic alteration temperatures of said starting material by linearly flowing said mixture through a plurality of straight flues, uninterrupted throughout their length, of a first regenerative mass which is progressively hotter in the direction of gas flow, burning a portion of and simultaneously catalytically endothermically altering substantially the remainder of said starting material by flowing the same through a combustion and endothermic alteration zone which has a catalyst disposed therein, said burning being controlled to supply all of the heat required for said endothermic alteration by controlling the amount of free oxygen-containing gas present in said mixture, cooling the reaction products emerging from said combustion and endothermic alteration zone by linearly flowing the same through a plurality of straight flues, uninterrupted throughout their length, of a second regenerative mass which is progressively cooler in the direction of gas flow, the direction of flow of gases through said regenerative masses and said combustion and alteration zone being reversed periodically, said reversal being effected substantially instantaneously, the heat withdrawn from the reaction products and stored in one of said regenerative masses to cool said products during gas flow in one direction being sufficient to preheat said mixture to endothermic alteration temperature during gas flow in the reverse direction, thereby avoiding the necessity of a separate reheating step, the maximum straight cross-sectional dimension of said flues not exceeding 0.75 inch, said flues being distributed substantially uniformly throughout each of said masses.

2. The process of claim 1 in which the catalyst is a nickel catalyst.

3. The process of claim 1 in which the residence time of the starting material in the flues of the preheating regenerative mass is not greater than $0.3x$ second, the residence time of the reaction products in the flues of the cooling regenerative mass is not greater than $0.3x$ second and the residence time of the reactants in the reaction zone is not greater than $0.05x$ second, $x$ representing the pressure in absolute atmospheres at which the process is carried out.

4. The process of claim 1 in which the starting material is a hydrocarbon.

5. The process of claim 4 in which the hydrocarbon is natural gas.

6. The process of claim 5 in which the natural gas is diluted with steam.

7. The process of claim 1 in which the straight cross-sectional dimension of said flues is between 0.375 and 0.5 in.

References Cited in the file of this patent

UNITED STATES PATENTS

| | | |
|---|---|---|
| 1,821,956 | Yee | Sept. 8, 1931 |
| 1,967,665 | Feiler et al. | July 24, 1934 |
| 2,313,157 | Linder | Mar. 9, 1943 |
| 2,230,467 | Nelly et al. | Feb. 4, 1941 |
| 2,421,744 | Daniels et al. | June 10, 1947 |
| 2,491,518 | Riblett | Dec. 20, 1949 |
| 2,517,525 | Cummings | Aug. 1, 1950 |
| 2,550,742 | Welty | May 1, 1951 |
| 2,552,737 | Rees | May 15, 1951 |

FOREIGN PATENTS

| | | |
|---|---|---|
| 583,851 | Germany | Sept. 13, 1933 |